Jan. 23, 1934. W. C. MAST Re. 19,064
METHOD AND APPARATUS FOR CONCENTRATING SULPHURIC ACID
Original Filed Sept. 22, 1927 3 Sheets-Sheet 1
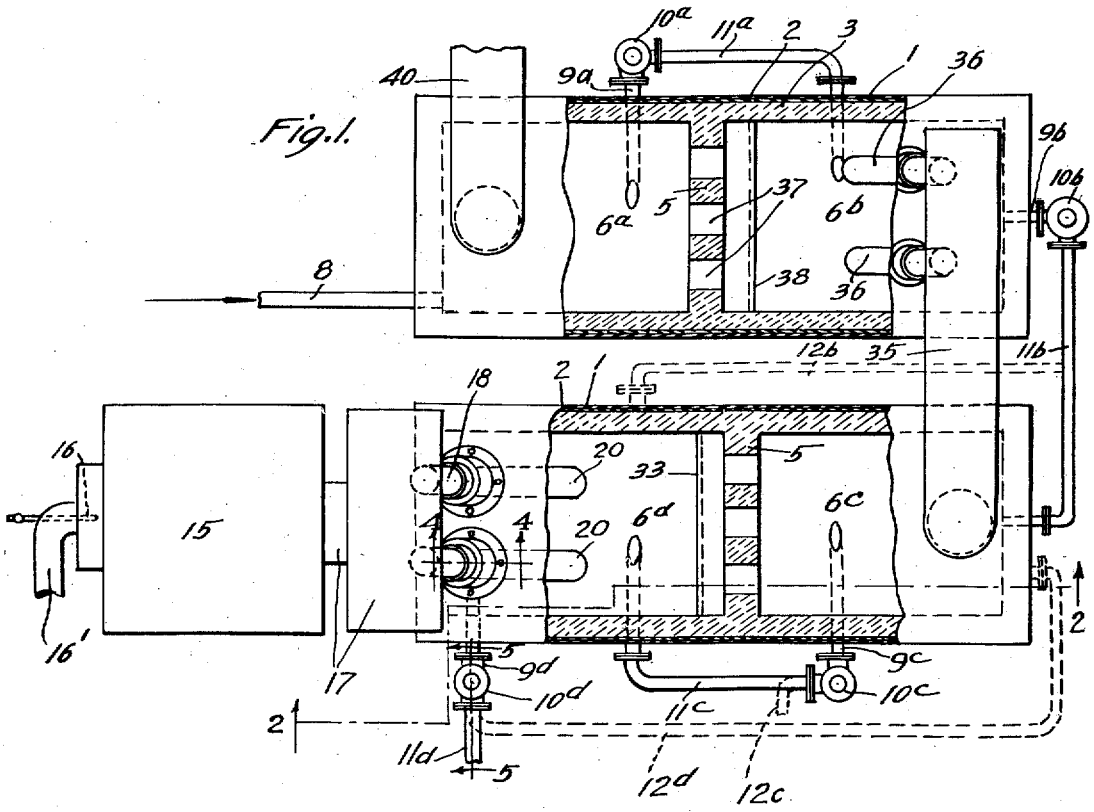
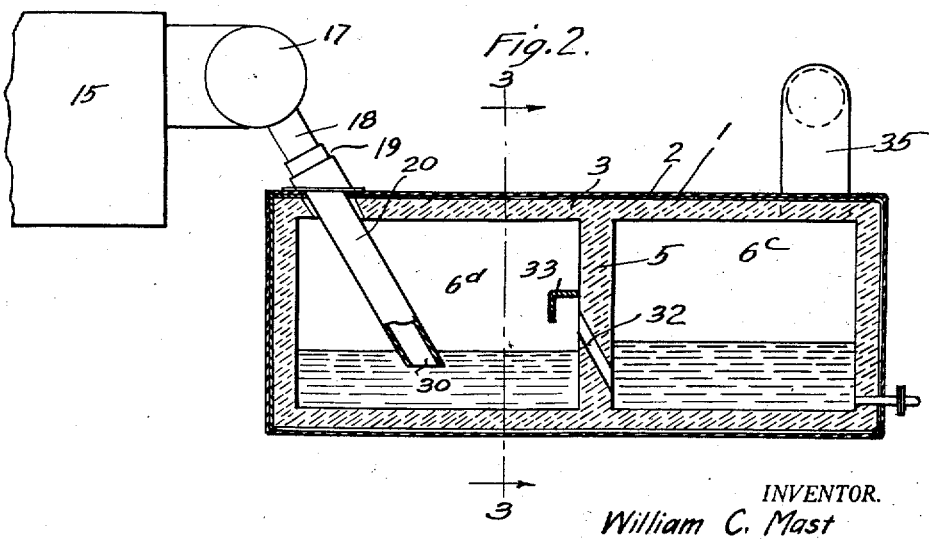
INVENTOR.
William C. Mast
BY Arthur P. Knight and
Alfred W. Knight
ATTORNEYS

METHOD AND APPARATUS FOR CONCENTRATING SULPHURIC ACID

Original Filed Sept. 22, 1927 3 Sheets-Sheet 2

INVENTOR.
William C. Mast
BY Arthur P. Knight and
Alfred W. Knight
ATTORNEYS

METHOD AND APPARATUS FOR CONCENTRATING SULPHURIC ACID
Original Filed Sept. 22, 1927 3 Sheets-Sheet 3
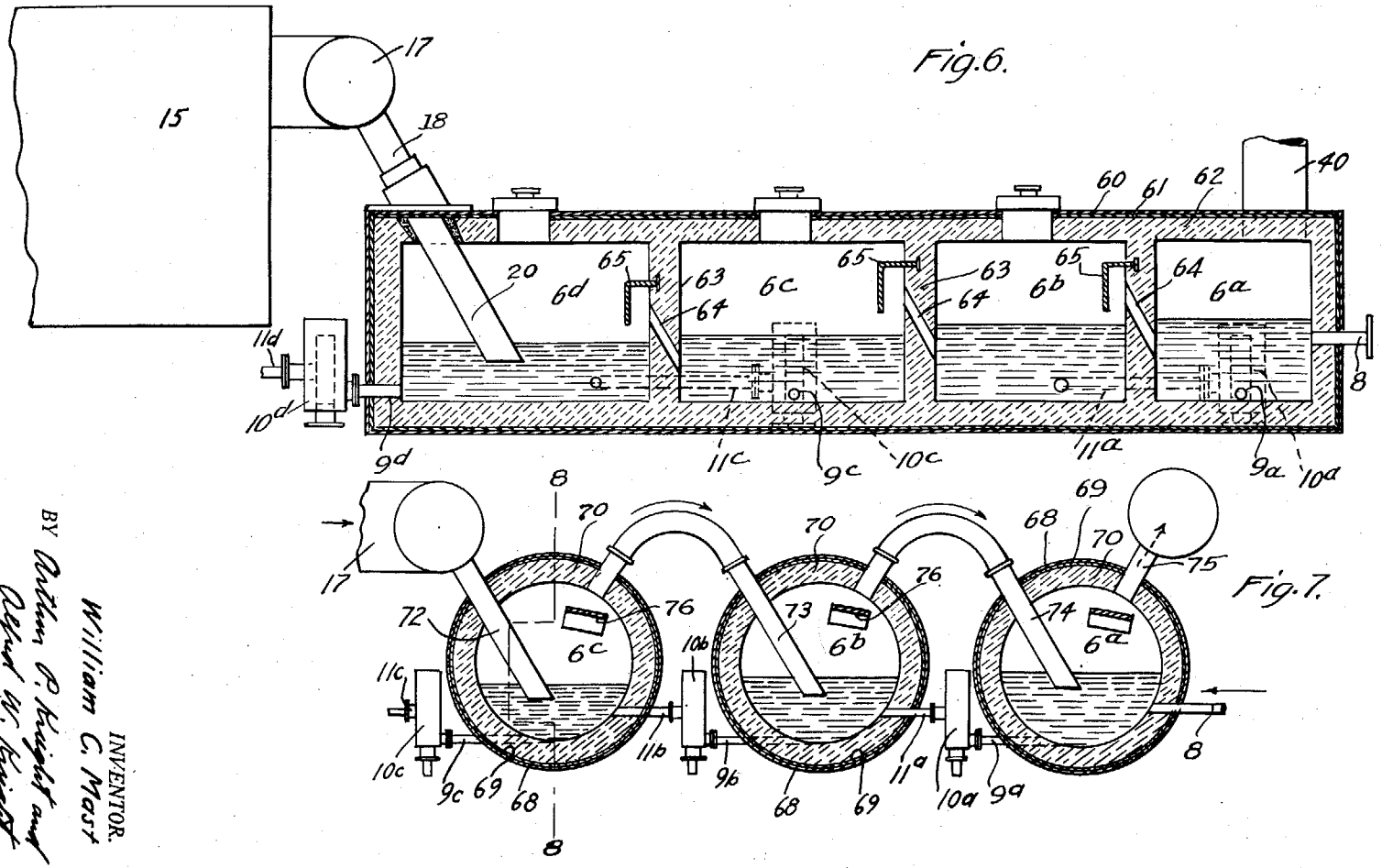
INVENTOR.
William C. Mast
BY Arthur P. Knight and
Alfred W. Knight
ATTORNEYS Reissued Jan. 23, 1934

Re. 19,064

UNITED STATES PATENT OFFICE 19,064

METHOD AND APPARATUS FOR CONCENTRATING SULPHURIC ACID

William C. Mast, Long Beach, Calif., assignor, by mesne assignments, to Chemical Construction Corporation, a corporation of Delaware Original No. 1,790,507, dated January 27, 1931, Serial No. 221,157, September 22, 1927. Application for reissue April 16, 1931. Serial No. 530,701

15 Claims. (Cl. 23—171)

This invention relates to the concentrating of liquids, especially sulphuric acid, and is particularly intended for concentration of sludge acid, that is to say, the acid recovered from the sludge resulting from the usual acid treatment of hydrocarbon or petroleum oils. While certain of the advantages of the process are more pronounced in the case of sludge acid concentration, the invention is, however, applicable to sulphuric acid concentration in general.

The main object of the invention is to provide a more economical and effective process and apparatus for concentrating sulphuric acid than have heretofore been in use.

Further and more particular objects of the invention are to provide for complete and efficient utilization of the available heat in the hot gases used for effecting the concentration, to permit the use of an apparatus having a lower first cost as well as a minimum cost of maintenance due to the practically indestructible construction thereof, to provide for absorption of acid vapors by bubbling the gases passing from a more concentrated portion of acid through a less concentrated portion of acid, thereby eliminating expensive absorption towers, to substantially eliminate all leakage of fumes from the concentrator and to permit a high degree of accessibility to all parts of the apparatus.

The method by which these operations are accomplished consists briefly in maintaining a plurality of bodies of acid defining a plurality of stages, continuously passing acid through said bodies or stages in succession, and causing a stream of hot gases to be successively delivered, preferably under pressure, beneath the surface of the respective bodies of acid so as to bubble upwardly therethrough, the gases after passing through one of said bodies of acid being delivered to and bubbled through another body of acid and so on. The direction of flow of hot gases through the successive bodies of acid is, in general, preferably counter-current to the direction of flow of acid, although some departure may occasionally be advantageously made from this procedure, as hereinafter described. In the case of straight counter-current flow the hot gases pass first through the body of most concentrated acid, then to the preceding body of acid containing slightly weaker acid and so on until they are finally passed through the most dilute acid.

This process may be carried out in a single horizontal cylindrical steel tank or drum, lined with lead and acid-resisting brick, and partitioned into a number of compartments through which the acid is conducted successively, the partitions being provided with slanting ducts leading from above the surface of the acid in one compartment to below the surface of the acid in the next succeeding compartment in the direction of gas flow. The apparatus may, however, comprise a plurality of smaller separate tanks connected for successive flow of acid therethrough and provided with suitable flues for conducting the gases from above the acid in one tank to beneath the surface of the acid in another, or it may consist of a combination of these two schemes, or any other suitabe arrangement of chambers for accomplishing the same result.

The use of cylindrical tanks lined with lead and acid-proof brick is, however, of particular advantage, since the cylindrical construction maintains the bricks tightly in position at all times and prevents checks and leakage of acid and fumes, which is inherent in other types of concentrating plants. Furthermore, these tanks will last practically indefinitely and minimize the maintenance cost.

It may be seen that as the hot gases pass from each stage or body of acid to the next they contain acid vapors carried off from the body through which they have just passed. By delivering these gases beneath the surface of a body of weaker acid, which is also cooler, these strong acid vapors are caused to be largely absorbed in such cooler and weaker acid. The acid vapors passing from this weaker acid, are delivered, in turn, with the gases, beneath the surface of a still weaker and cooler acid and are again absorbed. As no acid is evaporated and only water vapor is driven off when the acid has a concentration of less than 60° Bé., no acid fumes originate in the last body of acid through which the gases pass, and since as above described the acid fumes from the preceding bodies of acid are substantially all absorbed, the exit gases are substantially free from acid, containing only such particles as are carried over mechanically in suspension and which can be removed by suitable means such as a small scrubbing tower or box.

An important advantage of this method consists in the releasing of the hot gases beneath the surface of the acid so as to provide a large surface for evaporation of water therefrom and to also agitate the acid. The increased rate of evaporation obtained in this manner permits concentration to be effected at the same rate as though the boiling point were actually lowered more than 100° F. below its true boiling point at the prevailing pressure; and the lower temperatures which may therefore be used minimize decomposition of acid and facilitate absorption of acid fumes in the successively weaker and cooler acids and finally help to condense the last traces of acid mist in the exit gases. The temperature of the exit gases may readily be reduced by this method to not more than 230° F., and it may, therefore, be seen that a high proportion of available heat in the gases is utilized.

The hot gases employed in this process may consist of hot combustion gases, with or without a certain proportion of excess air, and such hot gases may be produced in any suitable type of furnace or combustion apparatus.

While, as above stated, the direction of gas flow is preferably in general counter-current to the flow of acid, it may be found desirable in some cases, especially when impurities are present (as in concentration of sludge acid), to pass the hot gases first through a compartment of less concentrated acid and then pass the partly cooled gases through the body of strongest acid, so as to prevent decomposition of the strong acid by the hot gases in the presence of such impurities.

The accompanying drawings illustrate apparatus which is suitable for carrying out the above described operations and which also forms a part of the present invention. Referring to these drawings:

Fig. 1 is a partly sectional plan view of one form of such apparatus.

Fig. 2 is a section on line 2—2 in Fig. 1.

Fig. 6 is a longitudinal section of a modified form of apparatus.

Fig. 7 is a longitudinal section of another modification.

Figure 3:
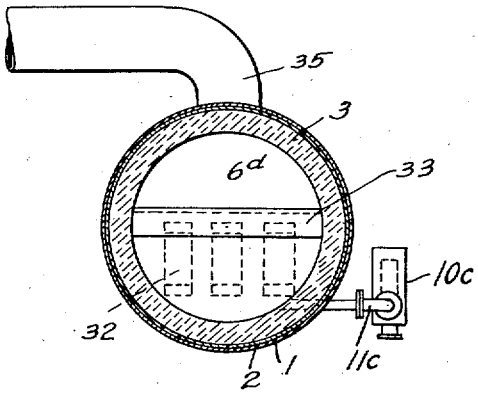
Fig. 3 is a transverse section on line 3—3 in Fig. 2.

The apparatus shown in Figs. 1, 2, and 3 comprises two horizontal cylindrical steel tanks 1, each of which is provided with a lead lining 2 and also with a lining 3 of acid-resisting brick within said lead lining, said acid-resisting brick being laid up in acid-resisting cement to prevent corrosive action of the hot acid on the metal. Each of these tanks is divided by a partition 5 into two chambers or compartments 6, said compartments being numbered 6*a*, 6*b*, 6*c*, and 6*d* in the order in which the acid passes therethrough in the case of straight counter-current flow. The acid may be delivered to chamber 6*a* by means of pipe 8, thence by means of pipe 9*a*, over-flow device 10*a*, and pipe 11*a* to chamber 6*b*, thence through 9*b*, 10*b*, and 11*b* to chamber 6*c*, then through 9*c*, 10*c* and 11*c* to chamber 6*d*, while the concentrated acid may be delivered through pipe 9*d*, over-flow device 10*d*, and pipe 11*d* to any suitable point for further disposition. The several pipes 9*a*, 9*b*, etc., preferably lead from the lowermost portion of the respective chambers so as to permit draining or flushing of said chambers through the over-flow devices as hereinafter described, while the pipes 11*a*, 11*b*, etc., may open into said chambers at any suitable height below the normal level of the acid therein.

Any suitable type of furnace or combustion chamber 15 may be provided, having burner means 16 for the combustion of fuel and being connected by flues 17 to the gas delivering pipes 20 leading into the acid chamber 6*d*. The hot gases are preferably forced through the apparatus under pressure by supplying air under pressure through flue 16′ to furnace 15.

Connection from flue 17 to the pipes 20 may be provided by means of short connecting pipes 18, said pipes 18 and 20 being connected by suitable expansion joint means 19 provided with packing 21 which serve to permit expansion and contraction of said pipes without causing undue strain thereon. The pipes 20 may extend through openings 22 in the brick lining 3, suitable packing 24 being provided around said pipes. The lead lining 2 is preferably doubled back over the edges of the steel shell 1 around said opening as indicated at 25 and a sleeve 26 may be provided, being secured to said lining and steel shell and extending upwardly around pipe 20 and being secured at its upper end to the members of the expansion joint 19 as at 27.

The pipes 20 extend to a suitable depth below the normal acid level in chamber 6*d*, and are open at their lower ends as shown at 30. In order to deliver the gases from chamber 6*d* to 6*c*, the partition 5 therebetween may be provided with a plurality of slanting ducts 32 which extend from above the acid level in the first of said chambers to below the acid level in the second chamber. Baffle 33 may be provided for minimizing mechanical entrainment of liquid particles through the ducts 32. From chamber 6*c* the gases may be led by means of flue 35 and delivery pipes 36 to beneath the surface of the acid in chamber 6*b*, the delivery pipes 36 being similar and connected in the same manner as the pipes 20 aforesaid. The partition 5 between chamber 6*b* and 6*a* is also provided with slanting ducts 37 for conducting gases from above the acid level in 6*b* to below the acid level in 6*a*, and with a baffle plate 38 similar to baffle plate 33. A gas exit flue 40 leads from the top of chamber 6*a*, for conducting the hot gases to a stack or to a suitable apparatus for recovery of acid mist or vapors therefrom such as a scrubbing tower or the like.

Figure 5:
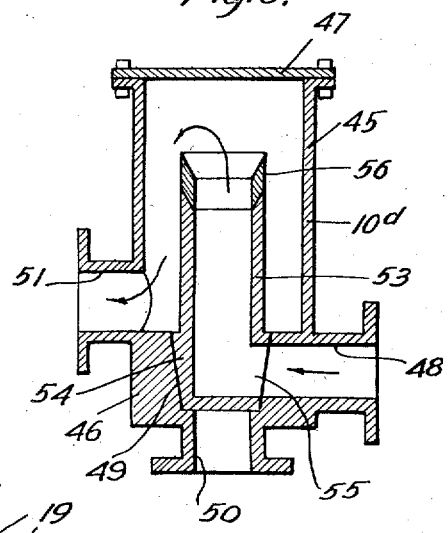
Fig. 5 is a section on line 5—5 in Fig. 1.
Figure 4:
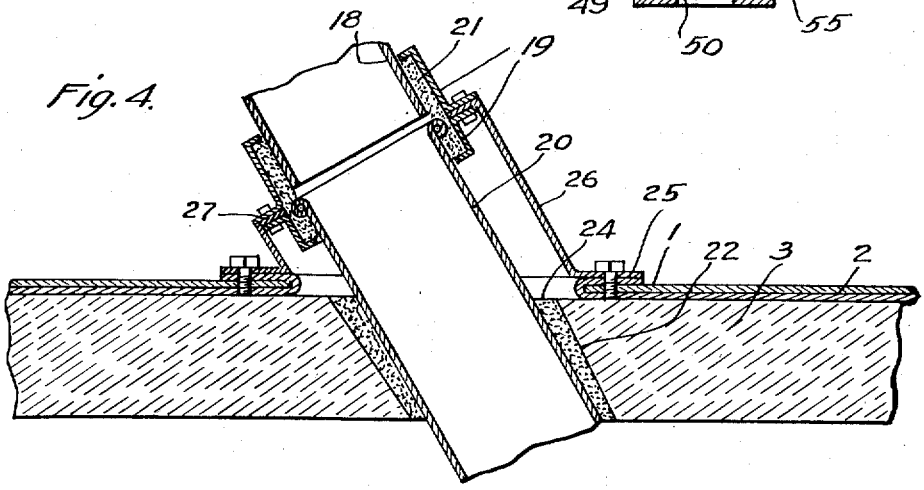
Fig. 4 is a section on line 4—4 in Fig. 1.

Each of the overflow devices may be similar in construction to the over-flow device 10*d* which is illustrated more particularly in Fig. 5. Such device comprises a tubular casing 45 having a base 46 and cover plate 47. An inlet passage 48 extends through the base 46 and communicates with a central recess 49 therein. A drain passage 50 extends downwardly from said recess 49 through the bottom of base 46, while an outlet passage 51 leads from the interior of casing 45 through the wall thereof. The passage means 48, 50, and 51 may be flanged at their outer ends as indicated, for connection of pipes thereto in well known manner. An overflow pipe 53 may be provided within the casing 45 and having a base portion 54 engaging in recess 49. Said base portion and recess are preferably tapered as shown and ground so as to provide a snug fit when the overflow pipe is lowered into said recess. Said overflow pipe is provided with a port 55 communicating with the inlet passage 48. The height of overflow pipe 53 may be adjusted by addition of pipe sections or rings 56 of varying heights at the upper end thereof, so as to regulate the height of the acid level in the tank which is connected to inlet passage 48. In practice the respective overflow pipes are preferably made of such height as to provide for a slight decrease in acid level in the successive tanks and thus maintain a steady flow of acid through the tanks. It will be apparent that with the overflow pipe in the position shown in Fig. 5, the acid, coming in this case from tank 6*d*, will be caused to flow upwardly within said pipe and over the upper edge thereof into the interior of casing 45 and then out through passage 51. However, by simply removing the cover plate 47 and raising overflow pipe 53 out of the recess 49, communication is established from inlet passage 48 through said recess to drain passage 50 so as to permit draining or flushing of the acid compartment to which the device is connected. The overflow pipe, therefore, also constitutes a removable plug for controlling flow of liquid through the drain opening.

The manner of carrying out the process in the above described apparatus will be apparent from the above description. Hot combustion gases are produced under pressure in furnace 15 and such gases are first delivered at suitable pressure through pipes 20 beneath the surface of the liquid in chamber 6*d*. In bubbling up through this body of acid the gases agitate and directly and internally heat the same and carry off water vapor therefrom, together with some acid fumes. These gases then pass through ducts 32 to chamber 6*c*, wherein this process is repeated and so on through the chambers 6*b* and 6*a*. A continual flow of acid is maintained through the chambers in the reverse direction, the rate of such flow being controlled by the rate at which dilute acid is supplied to the apparatus through pipe 8, and the proportion of concentration effected in each chamber being regulated by controlling the depth of acid therein by means of the overflow devices above described.

As stated above, it may be advantageous in some cases to depart from straight counter-current flow of gases and acid, to the extent of passing the hot gases first through a less concentrated body of acid in order to partially cool such gases before delivering the same to the most concentrated acid. This may be accomplished in the apparatus above described by substituting pipes 12*b*, 12*c*, and 12*d*, (as shown in dotted lines in Fig. 1) for the pipes 11*b*, 11*c*, and 11*d*, so that the acid is caused to pass from chamber 6*b* to chamber 6*d*, and then to chamber 6*c*. The gases thus pass first through a less concentrated body of acid in chamber 6*d* and then through the most concentrated acid in 6*c*.

In the apparatus shown in Fig. 6 the chambers 6*a*, 6*b*, 6*c* and 6*d* are all provided within a single cylindrical tank 60 provided as before with lead lining 61 and acid proof brick lining 62. Said chambers are separated as before by means of partitions 63 provided with inclined ducts 64 extending from above the acid level in each chamber to below the acid in the next succeeding chamber. Baffle plates 65 are also provided as before. The remainder of the apparatus is substantially the same as above described.

Figure 8:
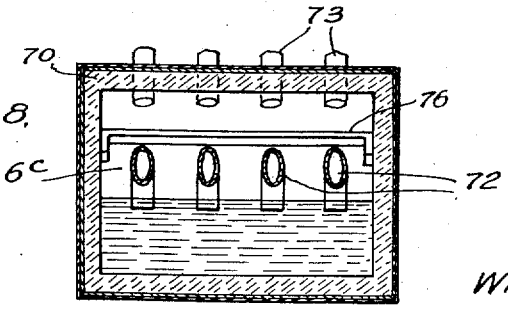
Fig. 8 is a section on line 8—8 in Fig. 7.

A further modification of the apparatus is shown in Figs. 7 and 8 in which the successive bodies of acid are contained in separate cylindrical tanks 68 lined as before with lead 69 and acid proof brick 70, and placed side by side. While I have shown only three chambers 6*a*, 6*b*, and 6*c* in this case it will be understood that any suitable number of chambers may be used in any of the forms of the invention. The hot gases are delivered, as before, beneath the surface of the acid in the chamber 6*c*, as by means of a plurality of pipes 72, while pipes 73 extend from the upper portion of chamber 6*c* to the lower portion of chamber 6*b*, and pipes 74 from the upper portion of chamber 6*b*, to the lower portion of chamber 6*a*. Pipes 75 conduct the gases away from the upper part of chamber 6*a*. Baffle plates 76 may be provided for preventing entrainment of liquid acid from one chamber to the next. Pipes 8, 9*a*, 11*a*, 9*b*, 11*b*, 9*c*, and 11*c* and overflow devices 10*a*, 10*b*, and 10*c* are provided, as before, for effecting and controlling flow of acid through the successive chambers.

Certain features of this invention may be advantageously applied in conjunction with the well known tower process of sulphuric acid concentration. For example, one or more of the acid chambers of any of the forms above described may be placed ahead of the concentrating tower in an apparatus such as shown, for example, in the patent to Hechenbleikner 1,456,874, and the acid may be passed first through the tower and then through said chamber or chambers, while the hot gases pass first through the chambers in the same manner as above described, and then upwardly through the tower in contact with the acid.

An advantage of this invention is the absence of exposure of a small stream of acid to gases at high temperature or to highly heated checker work structures, as in the ordinary tower process. The tower usually employed in such process consists of a checker work of acid proof brick and a relatively small stream of acid is allowed to flow downwardly through such checker work while the hot gases pass upwardly therethrough. The acid flow is frequently irregular in different parts of the tower, and portions of the checker work often become over-heated so that when acid is again brought into contact therewith, decomposition results, particularly in the presence of hydrocarbons such as are present in sludge acids. This decomposition is not only substantially eliminated by the practice of this invention, without the use of a tower, but is also minimized by the combination of this invention with the tower process as above described, since in that case the hot gases are first cooled by one or more passages through the acid before bringing the same into contact with the acid in the tower.

While I have for the sake of concreteness described my invention in its particular application to the concentration of sulphuric acid, it will be understood that it is also applicable to the concentration of acids by means of acid vapors generally, and further, to the concentration of liquids by means of gases, generally.

I claim:

1. The method of concentrating sulphuric acid by direct internal heat treatment which consists in maintaining a plurality of separate bodies of acid, continuously passing acid through said bodies in succession and causing a stream of hot gases to be successively delivered to and released beneath the surface of the respective bodies of acid so as to pass upwardly therethrough, the gases after passing through one of said bodies of acid being delivered to and passed through another of said bodies of acid.

2. The method as set forth in claim 1, in which the order of passing the gas through the bodies of acid is reverse to the direction of passage of acid therethrough.

3. The method of concentrating sulphuric acid by direct internal heat treatment which comprises passing such acid successively through a plurality of separate chambers, and also passing a stream of hot gases under positive pressure successively through said chambers, said gases being conducted from above the surface of the acid in one of said plurality of chambers to beneath the surface of the acid in another of said plurality of chambers, whereby the acid is heated to successively higher temperatures and concentrated to successively higher concentrations in the successive chambers in the direction of said acid flow and the gases are cooled to successively lower temperatures in the successive chambers in the direction of gas flow therethrough.

4. The method as set forth in claim 3, in which the direction of gas flow to the successive chambers is reverse to the direction of acid flow therethrough.

5. An apparatus for concentrating sulphuric acid by direct internal heat treatment comprising means defining a plurality of chambers, means for passing acid through said chambers in series, a furnace for producing hot gases and conduits for allowing said hot gases to pass under positive pressure successively through said chambers and for causing the gases to pass from above the acid level in one of said chambers to below the acid level in another of said chambers in the direction of gas flow.

6. An apparatus for concentrating sulphuric acid by direct internal heat treatment comprising a plurality of cylindrical metal tanks lined with acid resistant material, liquid conducting pipes connecting said tanks in series and provided with means for maintaining a definite liquid level in each tank, and gas conducting pipes connecting said tanks in series and extending from above the liquid level in one tank to below the liquid level in another tank.

7. In an apparatus for concentrating sulphuric acid by direct internal heat treatment, means defining two chambers, a furnace device for producing hot gases and a conduit for allowing said hot gases to flow into the lower portion of the first chamber, means for conducting hot gases from the upper portion of the first chamber to the lower portion of the second chamber, means permitting outflow of gases from the upper portion of said second chamber, and means for delivering acid to said second chamber, for passing acid from said second chamber to said first chamber, and for conducting acid away from said first chamber.

8. The method of concentrating sulphuric acid by direct internal heat treatment which consists in maintaining the acid in separate bodies defining a plurality of separate stages, in flowing the acid through said stages serially for progressively increasing concentration, and in flowing heated gases serially through and beneath the surface of the acid bodies in said plurality of stages for effecting the progressive concentration of said acid, the gases being delivered to each of the acid bodies below the surface thereof and said gases after flowing through the acid body in one of said stages being delivered to the acid body in another of said stages.

9. The method of concentrating sulphuric acid by direct internal heat treatment which consists in maintaining the acid in separate bodies defining a plurality of separate stages, and in producing hot gases in a furnace device, introducing said heated gases serially through and beneath the surfaces of the acid bodies in said plurality of stages, the gases being delivered to each of the acid bodies below the surface thereof so as to pass upwardly therethrough, and said gases after flowing through the acid body in one of said stages being delivered to the acid body in another of said stages.

10. The method of concentrating a liquid by direct internal heat treatment which consists in maintaining a plurality of separate bodies of the liquid, continuously passing the liquid through said bodies in succession, and causing a stream of hot gases to be successively delivered to and released beneath the surface of the respective bodies of liquid so as to pass upwardly therethrough, the gases after passing through one of said bodies of liquid being delivered to and passed through another of said bodies of liquid.

11. The method of concentrating a liquid by direct internal heat treatment which comprises passing such liquid successively through a plurality of separate chambers, and also passing a stream of hot gases under positive pressure successively through said chambers, said gases being conducted from above the surface of the liquid in one of said plurality of chambers to beneath the surface of the liquid in another of said plurality of chambers, whereby the liquid is heated to successively higher temperatures and concentrated to successively higher concentrations in the successive chambers in the direction of liquid flow and the gases are cooled to successively lower temperatures in the successive chambers in the direction of gas flow therethrough.

12. An apparatus for concentrating a liquid by direct internal heat treatment comprising means defining a plurality of chambers, means for passing liquid through said chambers in series, a furnace for producing hot gases and conduits for allowing said gases to pass under positive pressure successively through said chambers and for causing the gases to pass from above the liquid level in one of said chambers to below the liquid level in another of said chambers in the direction of gas flow.

13. In an apparatus for concentrating a liquid by direct internal heat treatment, means defining two chambers, a furnace device for producing hot gases and a conduit for allowing said hot gases to flow into the lower portion of the first chamber, means for conducting hot gases from the upper portion of the first chamber to the lower portion of the second chamber, means permitting outflow of gases from the upper portion of said second chamber, and means for delivering liquid to said second chamber, for passing liquid from said second chamber to said first chamber, and for conducting liquid away from said first chamber.

14. The method of concentrating a liquid by direct internal heat treatment which consists in maintaining the liquid in separate bodies defining a plurality of separate stages, in flowing the liquid through said stages serially for progressively increasing concentration, and in flowing heated gases serially through and beneath the surface of the liquid bodies in said plurality of stages for effecting a progressive concentration of said liquid, the gases being delivered to each of the liquid bodies below the surface thereof, and said gases after flowing from the liquid body in one of said stages being delivered to the liquid body in another of said stages.

15. The method of concentrating a liquid by direct internal heat treatment which consists in maintaining the liquid in separate bodies defining a plurality of separate stages, and in producing hot gases in a furnace device, introducing said heated gases serially through and beneath the surfaces of the liquid bodies in said plurality of stages, the gases being delivered to each of the liquid bodies below the surface thereof so as to pass upwardly therethrough, and said gases after flowing through the liquid body in one of said stages being delivered to the liquid body in another of said stages.

WILLIAM C. MAST.